United States Patent
Gollner et al.

[19]

[11] Patent Number: 5,881,629
[45] Date of Patent: Mar. 16, 1999

[54] CONTROL DEVICE FOR VARIABLE HYDRAULIC MACHINES

[75] Inventors: Wilhelm Gollner, Neumunster; Eckhard Skirde, Aukrug-Boeken, both of Germany

[73] Assignee: Sauer Inc., Ames, Iowa

[21] Appl. No.: 808,236

[22] Filed: Feb. 28, 1997

Related U.S. Application Data

[63] Continuation of Ser. No. 280,371, Jul. 26, 1994, abandoned.

[30] Foreign Application Priority Data

Aug. 17, 1993 [DE] Germany ............................ 43 27 667.9

[51] Int. Cl.$^6$ ...................................................... F01B 3/10
[52] U.S. Cl. ............................. 91/505; 91/506; 417/218; 417/222.1
[58] Field of Search .................................. 417/218, 222.1; 91/505, 506; 60/443, 445, 446

[56] References Cited

U.S. PATENT DOCUMENTS

| | | | |
|---|---|---|---|
| 3,739,974 | 6/1973 | Kiwalle et al. | 417/222.1 X |
| 4,487,109 | 12/1984 | Burandt et al. | 91/506 |
| 4,510,750 | 4/1985 | Izumi et al. | 60/443 |
| 4,801,247 | 1/1989 | Hashimoto et al. | 417/218 X |
| 5,017,094 | 5/1991 | Graf et al. | 91/506 X |
| 5,085,052 | 2/1992 | Kawanaka et al. | 91/506 X |
| 5,138,838 | 8/1992 | Crosser | 60/445 X |
| 5,197,864 | 3/1993 | Lunzman et al. | 417/218 |
| 5,443,587 | 8/1995 | Takizawa | 417/222.1 |
| 5,687,361 | 11/1997 | Kim et al. | 417/222.1 |

*Primary Examiner*—Timothy Thorpe
*Assistant Examiner*—Cheryl J. Tyler
*Attorney, Agent, or Firm*—Zarley, McKee, Thomte, Voorhees & Sease

[57] ABSTRACT

A control device for variable hydraulic machines, and specifically for variable axial piston machines equipped with a servo system that is connected to a swash plate so that the discharge/displacement volume is infinitely variable. The hydraulic machine is equipped with a sensor that detects the piston displacement and is connected with an electronical control unit that controls the swash angle position of the swash plate and is pressure controlling the servo system by an electrohydraulic converter. A method for the infinite controlling of the volume flow of hydraulic machines, by which the servo system is connected to the swash plate of the hydraulic machine, and by which a conduction of a signal from a sensor to the control unit, a pressure controlling of the servo system by an electrohydraulic converter as well as the controlling of the swash angle position of the swash plate by the electronical control unit is realized.

5 Claims, 9 Drawing Sheets

CONTROL DEVICE FOR VARIABLE HYDRAULIC MACHINES

This is a continuation of application Ser. No. 08/280,371 filed on Jul. 26, 1994, now abandoned.

BACKGROUND OF THE INVENTION

The present invention relates to a control device for variable displacement hydraulic machines, more particularly for variable displacement axial piston machines equipped with a servo system. A method for the swash angle position control is also disclosed.

Electronic proportional swash angle position controls of the prior art for hydraulic machines, particularly axial piston machines, feature a costly mechanical swash angle position feedback device. The position of the swash angle is transmitted onto a measuring spring that is itself positioned by a balance of forces generated by a control spool. The control spool has metering edges which control the swash angle position. The control spool is actuated either mechanically by a proportional solenoid or hydraulically by a torque motor with a nozzle flapper system or by an electrical proportional pressure reducing valve. Existing mechanical swash angle position feedback devices are costly because closed circuit variable hydraulic machines must have a precise neutral position. For that reason, a neutral adjustment device has to be incorporated in the mechanical swash angle position feedback device, and additionally the hydraulic machines have to operate in both directions and thus the feedback spring has to be effective in both directions.

Torque motors, pressure reducing valves controlled by proportional solenoids, or proportional solenoids applied directly to the control spool of the control system of the hydraulic machine are used in an already known manner for the actuation of the servo system.

A torque motor is typically equipped with one or more coils, which generate a force in the air gaps of the magnetic circuit proportional to the current through the coils. This force is transmitted via the armature on to a nozzle flapper system and thereby generates a differential pressure signal that is proportional to the current. The differential pressure acts on the control spool and is balanced by the force of the feedback spring. The metering edges of the control spool, which are connected via drilled control holes with the servo piston of the servo system, facilitate the establishment of the desired swash angle position. The actuation of the control spool (pilot control system) in conjunction with the position feedback of the swash angle position by means of the measuring spring is relatively complex. Such systems are revealed in U.S. Pat. No. 5,205,201.

As an alternative to the torque motor, a proportional solenoid controlled pressure reducing valve, which generates a pressure proportional to the current, is used for the hydraulic pilot control system in an already known manner. The valve acts on each face area of the control spool. With such a system a feedback spring is also used for the position feedback of the swash angle position.

Similarly, a feedback spring is used in the case of the direct actuation of the valve spool by means of a proportional solenoid. The proportional solenoid acts on a face area of the control spool.

All of these systems require a costly mechanical position feedback device for establishing the swash angle position, as well as a costly mechanically neutral adjustment device for the feedback linkage. The neutral adjustment is necessarily affected by the summation of the manufacturing tolerances. Additionally the assembly of the feedback spring between the swashplate or the servo piston and the control spool requires an enormous effort. All this together results in high costs for building a system to attain complete control of a hydraulic machine.

Therefore the principal object of this invention is to appropriate a simple, precise and cost effective method for providing swash angle position control on hydraulic machines as well as a device for the realization of that method.

These and other objects will be apparent to those skilled in the art.

SUMMARY OF THE INVENTION

According to the present invention, a variable displacement hydraulic machine is equipped with a servo system that has a swash plate which is controllable or variable to an infinite number of positions each corresponding to a given displacement volume for the machine. The hydraulic machine features a sensor that is connected with an electronic control unit, which is controlling the swash angle position, as well as a servo system that is pressure controlled by means of an electrohydraulic convertor.

The variable hydraulic machine equipped with the device in accordance to the invention is used for the realization of the method for a swash angle position control with an incorporated electronic swash angle position feedback. The method contains the following steps: controlling servo system pressure by means of an electrohydraulic convertor, transmitting of a signal from a sensor to the electronic control unit; and controlling the swash angle position of the swash plate of the corresponding hydraulic machine by means of the control unit in response to the sensor signal.

DESCRIPTION OF THE PREFERRED EMBODIMENT

Figure 1:
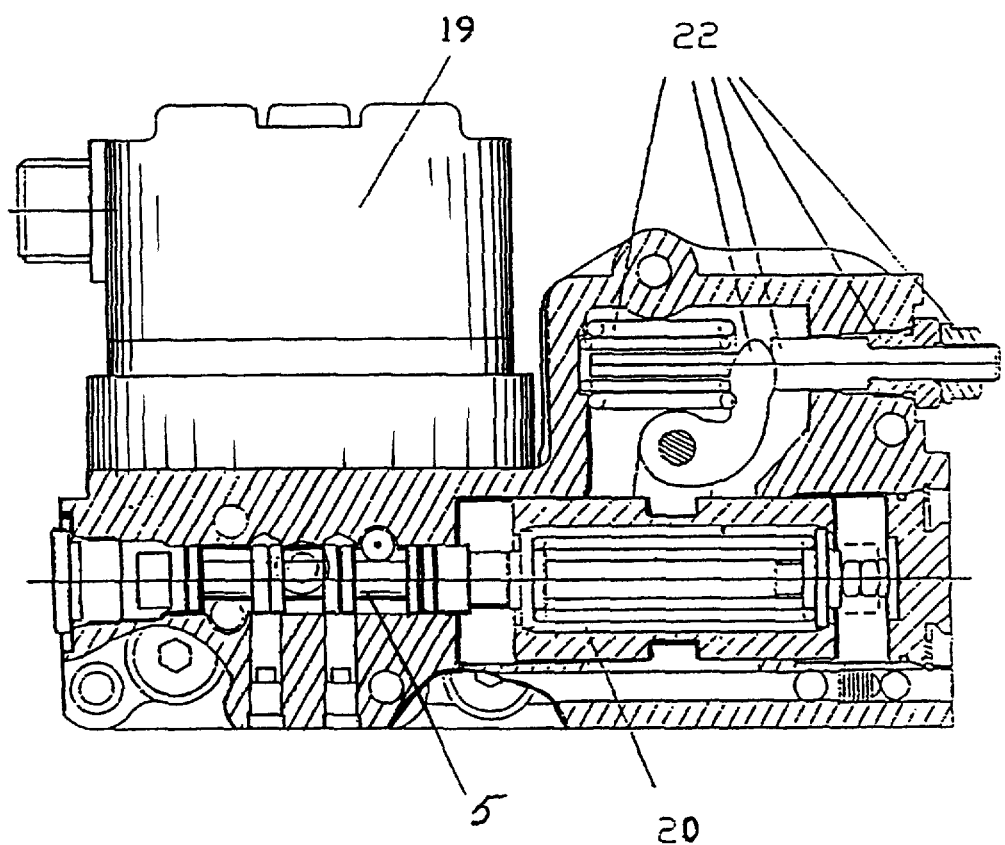
FIG. 1 is a cross-sectional view of a prior art electrohydraulic servo control equipped with a pilot control by means of a torque motor.
Figure 2:
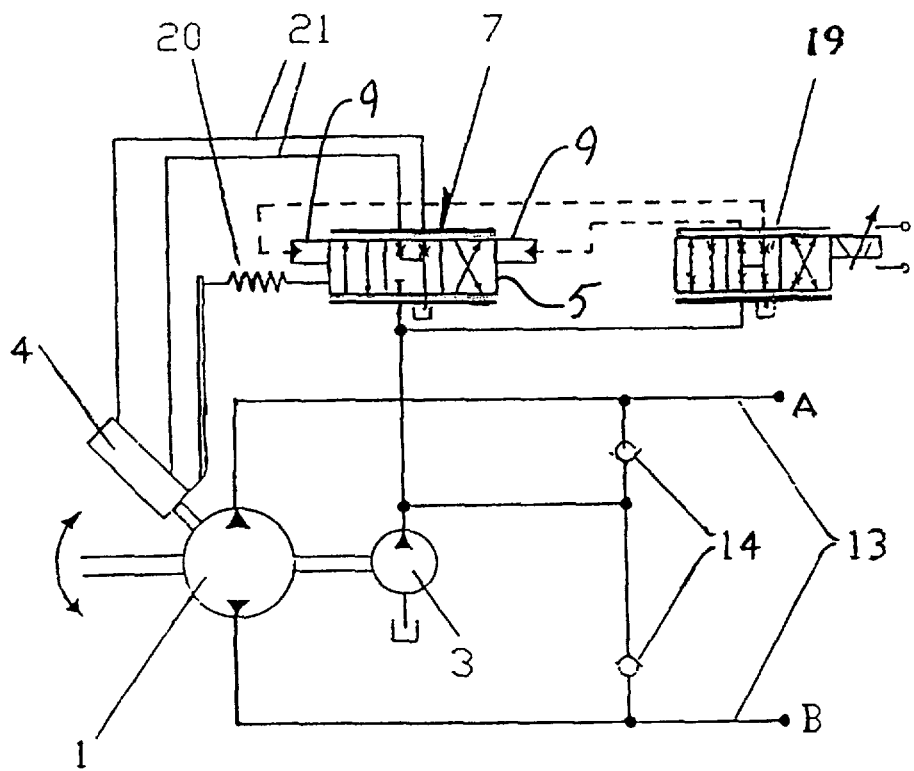
FIG. 2 is a schematic diagram of a prior art swash angle position control of an axial piston pump equipped with a pilot control by means of a torque motor.
Figure 3:
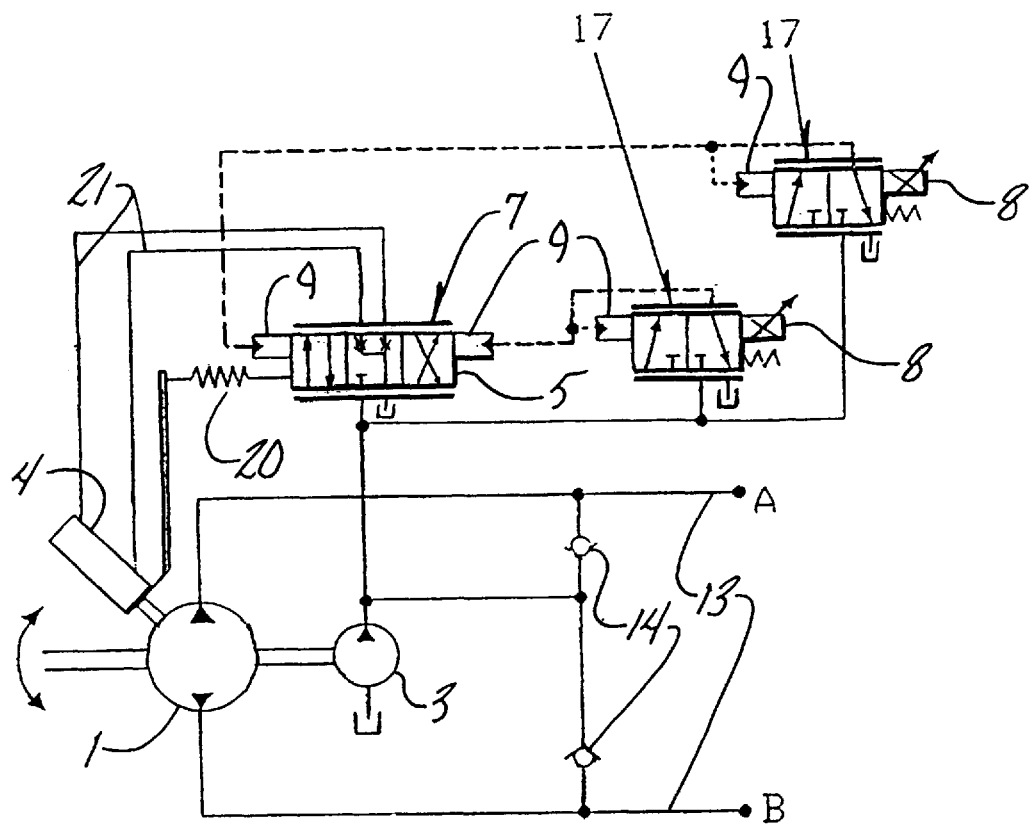
FIG. 3 is a schematic diagram of a prior art swash angle position control equipped with a pilot control by means of a proportional pressure reducing valve.
Figure 4:
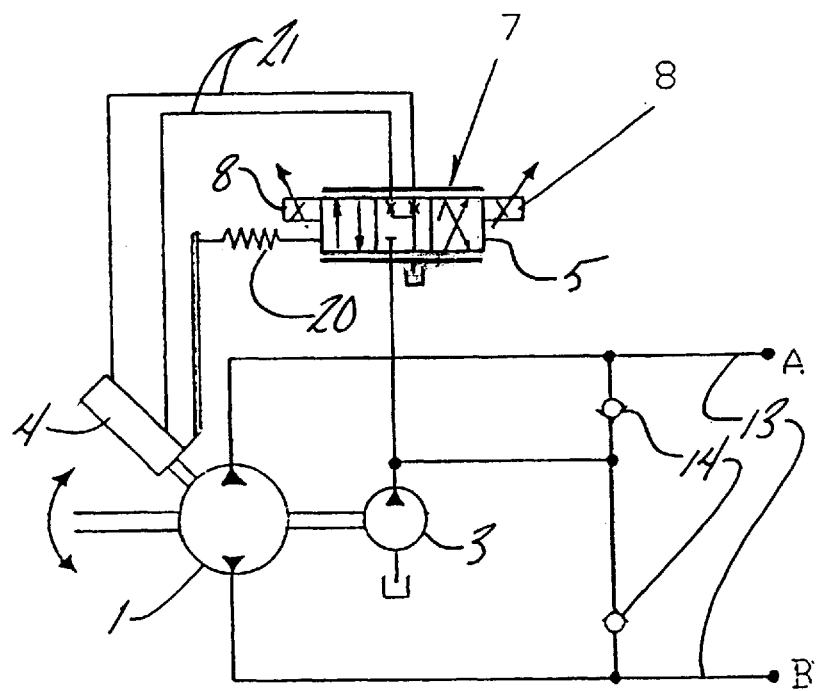
FIG. 4 is a schematic diagram of a prior art swash angle position control equipped with a direct actuation by means of a proportional solenoid.

FIG. 1 shows a cross-sectional view of the relative complex prior art design of an electrohydraulic servo control equipped with a pilot control by means of a torque motor 19. The torque motor 19 positions the control spool 5 in a conventional manner. The spool 5 is mechanically connected to a feedback spring 20. Additionally, a neutral adjustment 22 also has to be provided and incorporated in the mechanical feedback. The schematic circuit diagrams of FIGS. 2, 3 and 4 depict a swash angle position control equipped with a pilot control by means of a torque motor 19 (FIG. 2), a pilot control by means of a proportional pressure reducing valve (FIG. 3), and direct actuation by means of a proportional solenoid 8 (FIG. 4). An axial piston pump 1, whose swash plate is stroked or positioned by means of the servo system 4, is preferably connected to a hydraulic motor via fluid passages or working conduits 13. A charge pump or feeding pump 3 is mechanically connected to the axial piston pump 1 and is associated with the servo system 4 via the control spool valve 7 and via the control conduits 21. A check valve 14 is provided between the charge pump 3 and the working conduits 13 for charging the low pressure conduit in each discharge direction. The control spool valve 7 is actuated through solenoids 9 is mechanically connected to the swashplate or the servo piston via the feedback spring 20 and via corresponding linkage (not shown). Pilot control of the control spool valve 7 is realized via a torque motor 19 according to FIG. 2, via two proportional pressure reducing valves 17 according to FIG. 3, and via a direct actuation by two proportional solenoids according to FIG. 4, respectively.

Figure 5:
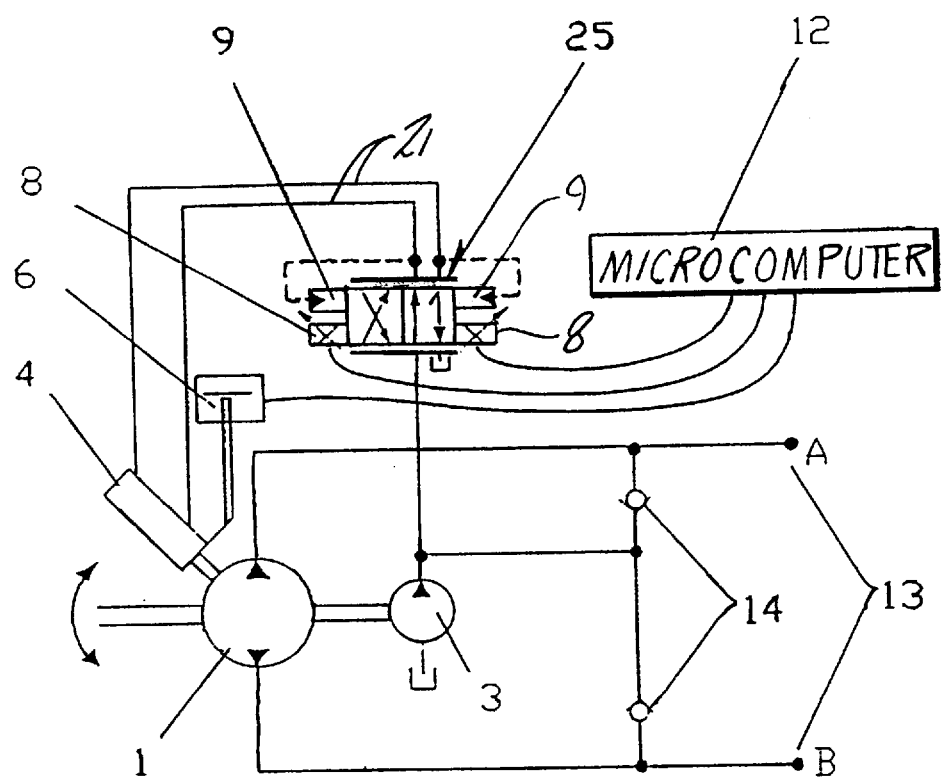
FIG. 5 is a schematic diagram of this invention showing a single stage pressure control including an electronic swash angle position feedback.

FIG. 5 shows a preferred embodiment of an electronic swash angle position feedback in accordance to the invention. Herein the conventional mechanical feedback, including the neutral adjustment 22 and the feedback spring 20, is eliminated. A signal indicative of the position of the swashplate (or the servo piston) is provided to the electronic control unit 12. The electronic control unit comprises a microcomputer having a sensor 6 that is connected to the swashplate or servo piston. Preferably the sensor 6 is a linear position transducer, but an angle transducer could be connected directly to the swashplate instead. The swash angle position output feedback signal is transmitted or fed back to the electronic control unit that controls the swash angle position in a preferably closed loop control circuit. Such a closed loop control results not only in a cost reduction, but eliminates the disadvantages of the limited precision offered by an open loop control. Particularly the so-called "downhill-effect" is eliminated. This effect occurs in the hydrostatic transmission in the case of a reversal of the power flow, because the reversal of the internal moments on the servo system. In the case of such a power flow reversal the conventional swash angle position control has to build up pressure at the opposite side of the servo system and has therefore to go through the deadband of the control spool valve 7 (FIG. 4). This results in an unwanted swash angle magnification.

The closed loop swash angle position control of this invention offers special advantages because of the pressure control for the actuation of the servo system 4. In the event of a failure of the electronic control unit 12, the electrohydraulic convertor 17; 18, 19; 10, 18; 17; 25 (i.e., the proportional solenoid 8 (FIGS. 5, 6) or the torque motor 19 (See FIG. 7)), allows the control pressure on the servo piston to be reduced to zero. The axial piston pump 1 is destroked by means of a spring (not shown) of the servo system 4. This action is not possible when conventional servo valves are used for the actuation of the servo piston, as is typical in conjunction with open and closed loop cylinder position control systems. Conventional servo valves having electrical components, such as a solenoid 8 (FIG. 4) or a torque motor 19 (FIG. 2), do not return the servo system 4 to a neutral position when one of the electrical components fails. As best understood from FIG. 4, the pressure trapped in the output lines to the servo system cylinder 4 cannot open the servo valve 7 in order to be relieved to the case. Unfortunately, this unrelieved pressure biases the servo system to a non-neutral position. However, the present invention feeds the output pressure from the valve 25, 17, 18 back to the end face of its spool (see the dashed lines above the valves 25, 17, 18, etc.) where the area allows a sufficient force to be generated so as to urge the spool to a draining or relieving position. Thus, the valve relieves or controls itself until the output pressure seen by the servo system 4 is equal to case pressure. Thereafter, the servo system cylinder 4 can float to its neutral position despite the electrical failure.

Figure 6:
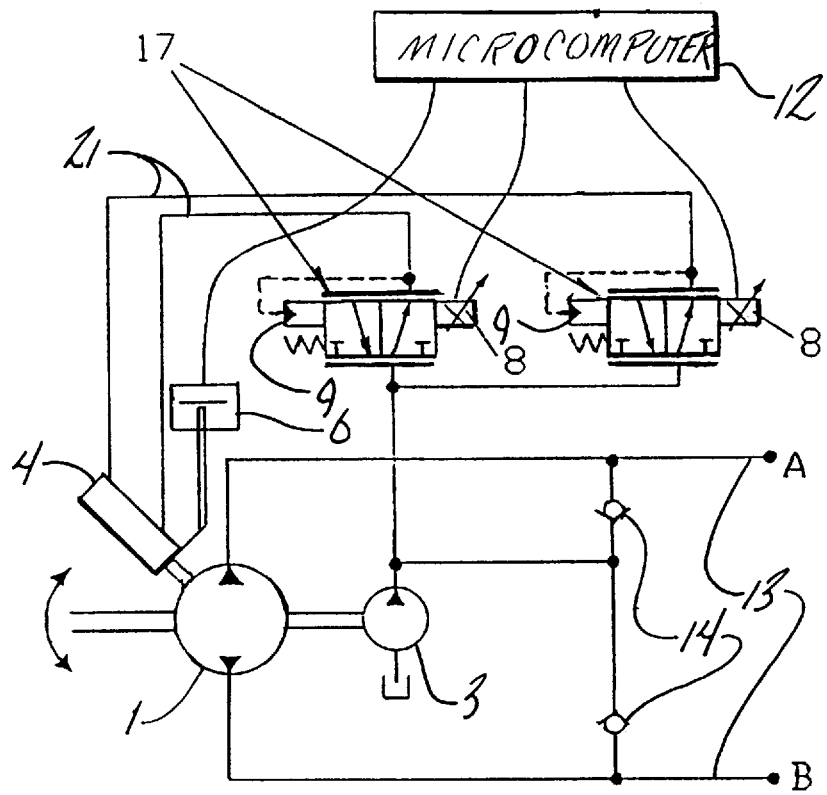
FIG. 6 is a schematic diagram of this invention showing a single stage pressure control including an electronic swash angle position feedback.

In FIG. 6 a single stage pressure control including an electronic swash angle position feedback is shown with two single proportional pressure reducing valves 17 which are each equipped with a proportional solenoid 8.

Figure 7:
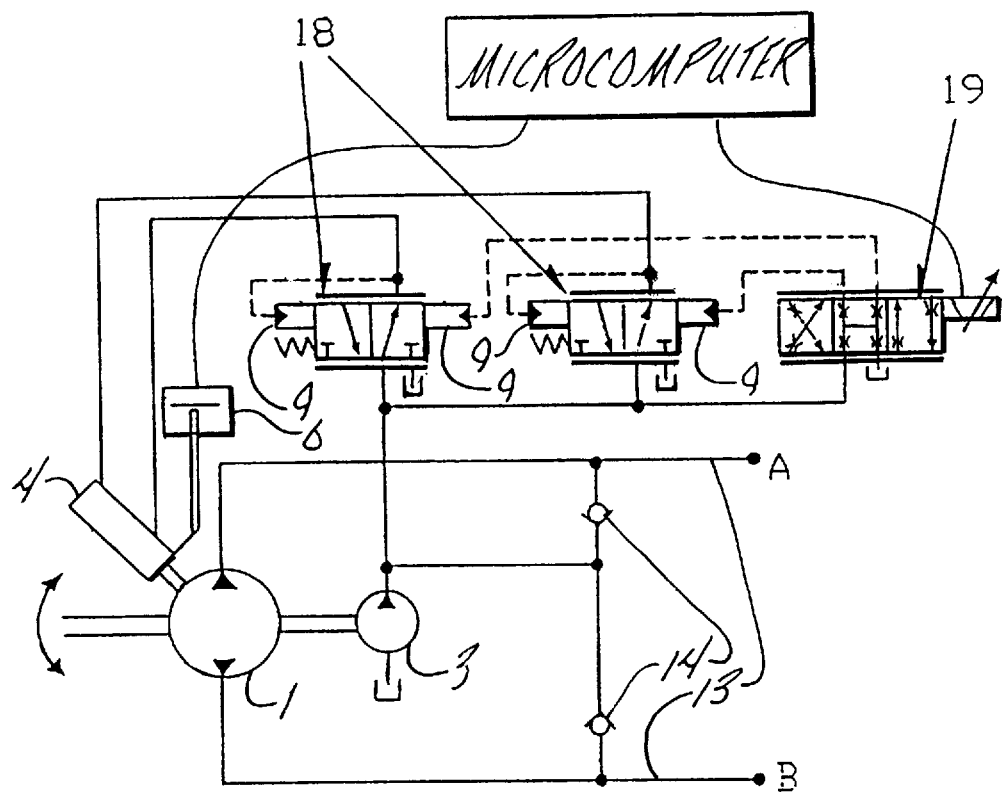
FIG. 7 is a schematic diagram of this invention showing a two-stage pressure control including an electronic swash angle position feedback.

FIG. 7 shows the actuation of the servo piston similar to that in FIG. 5, but equipped with two three-way/two-position directional pressure reducing valves 18, which are pilot controlled by means of a flapper-nozzle system of a torque motor 19. This swash position control system features a remarkably improved dynamic behavior because of the torque motor 19.

Figure 8:
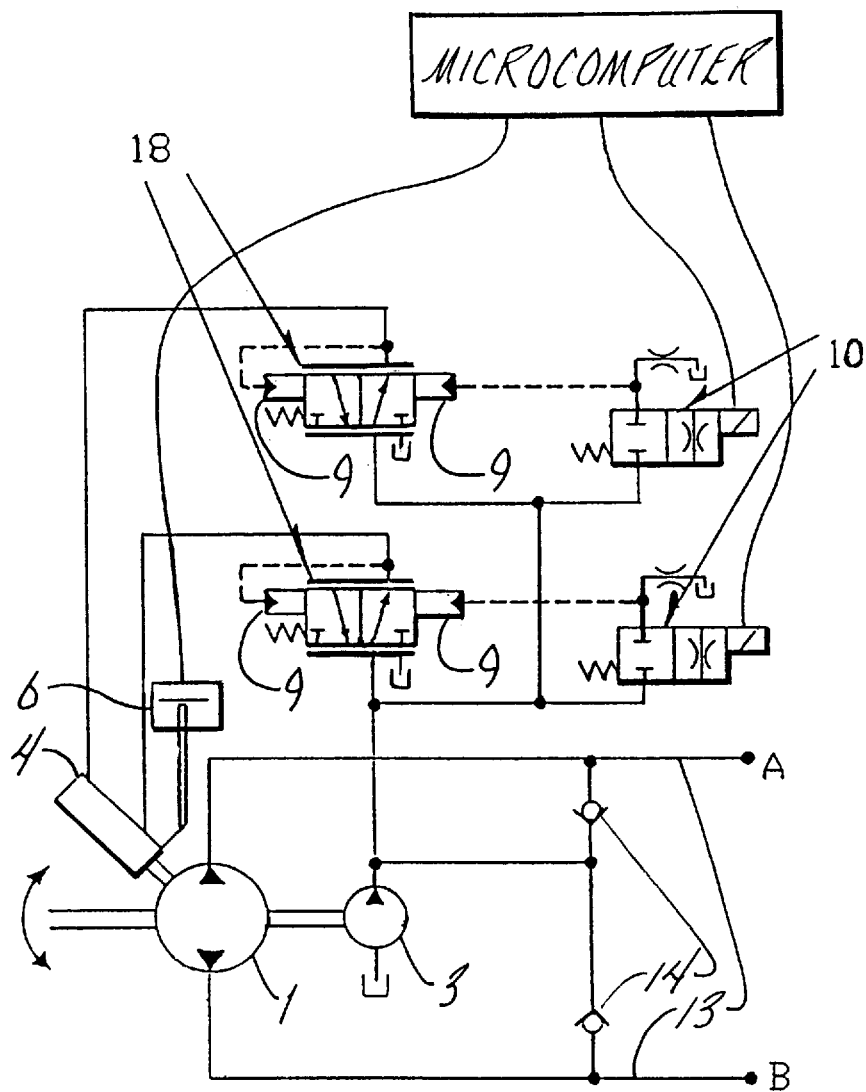
FIG. 8 is a schematic diagram of this invention showing a two-stage pressure control equipped with a pilot control by means of digital valves and including an electronic swash angle position feedback.

FIG. 8 shows an embodiment where the pilot control is designed by means of digital valves 10. The digital valves 10 generate a measure signal that is usable for the pilot control by means of a pulse with modulated actuation in conjunction with a drain orifice. In this embodiment two three-way/two-position directional pressure valves 18 are also arranged.

Figure 9:
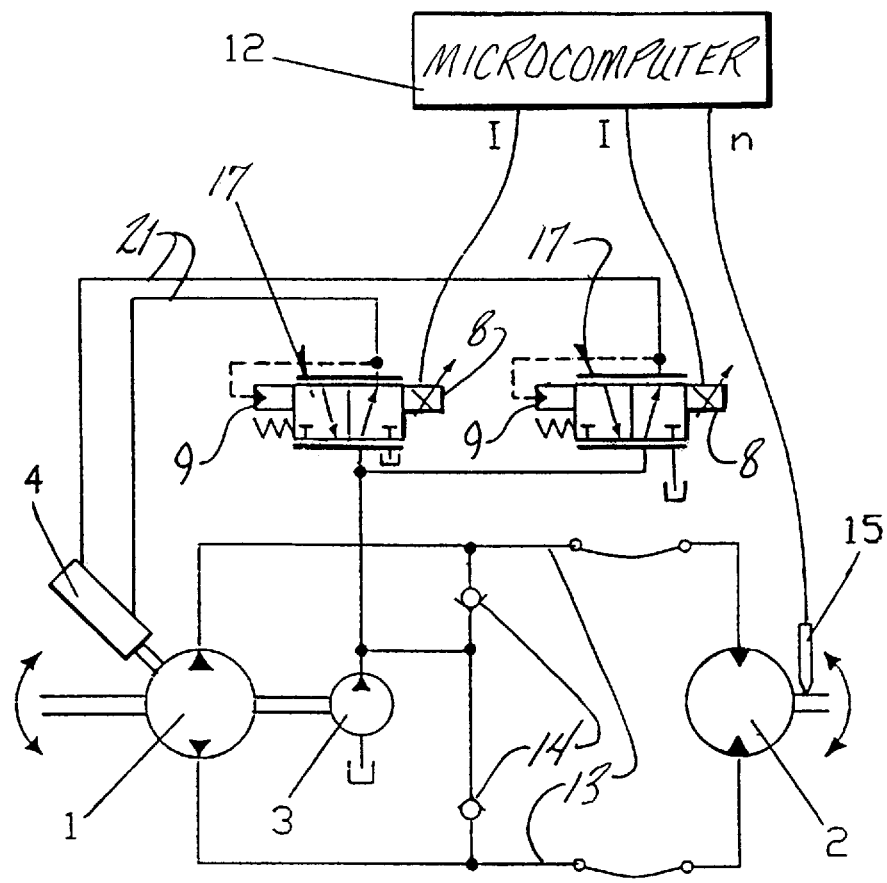
FIG. 9 is a schematic diagram of this invention showing a single stage pressure control including an electronic speed feedback.

In the embodiment of FIG. 9, no direct swash angle position feedback is provided. Instead, the swash angle position is indirectly determined from the resulting speed "n" of the hydraulic motor 2 (fluidly connected to the pump 1). The motor speed is conducted by a speed pick up sensor 15 to the electronic control unit 12. The swash angle position is controlled in a closed loop through the electrohydraulic convertors 17 by the current (I) sent thereto from the electronic control unit 12.

The method for the infinite control of the volume of flow of hydraulic machines 1, 2 with the servo system 4 connected with the swashplate of the hydraulic machines 1,2 is executed by a control device in accordance with FIGS. 5–9. It comprises the steps: a) Controlling the pressure of the servo system 4, preferably by means of an electrohydraulic convertor 17 that is actuated by a pilot control (preferably consisting of a proportional solenoid 8, digital valves 10 or a torque motor 19); b) conducting of a signal to the control unit 12 from a sensor that is arranged at the servo piston as a position transducer or at the motor as a speed sensor; and c) controlling of the swash angle position of the swashplate by means of the electronic control unit 12 and on the basis of the supplied sensor signals.

What is claimed is:

1. A control device for variable displacement hydraulic machines having a servo system (4) connected to a movable swash plate so that the displacement volume of the variable displacement hydraulic machine is infinitely variable, comprising:

a sensor connected with an electronic control unit for controlling a swash angle position of the swash plate; and the servo system (4) being pressure controlled by means of an electrohydraulic converter (17; 18, 19; 10, 18; 17;

25) connected to the electronic control unit (12) and the servo system (4) so as to form a closed loop control system, the electrohydraulic converter having a movable spool therein and receiving an electrical input current from the electronic control unit (12) and having an output pressure to the servo system (4) which is proportional to the input current, a pilot pressure passage fluidly connecting the output pressure of the electrohydraulic converter with the spool so as to provide a hydraulic pilot pressure signal based upon the output pressure of the electrohydraulic converter, whereby the pilot pressure signal urges the spool into a position which allows the output pressure to drain from the servo system back through the electrohydraulic converter during an electrical failure affecting the electrohydraulic converter and thereby allows the servo system to seek to a neutral position.

2. A control device for variable displacement hydraulic machines equipped with a servo system (4) connected to a swash plate so that the displacement volume of the hydraulic machine is infinitely variable, comprising:

a sensor connected with an electronic control unit (12) for controlling the swash angle position of the swash plate, and an electrohydraulic convertor (25; 17; 18, 19; 10, 18; 17) for pressure controlling the servo system (4) connected to the electronic control unit (12) and the servo system (4) so as to form a closed loop control system, the electrohydraulic convertor having a movable spool therein and receiving an electrical input current from the electronic control unit (12) and having an output pressure to the servo system (4) which is proportional to the input current, a pilot pressure passage fluidly connecting the output pressure of the electrohydraulic converter with the spool so as to provide a hydraulic pilot pressure signal based upon the output pressure of the electrohydraulic converter, the electrohydraulic convertor receiving at an end of the spool therein the hydraulic pilot pressure signal based upon the output pressure of the electrohydraulic convertor whereby the pilot pressure signal urges the spool into a position which allows the output pressure to drain from the servo system back through the electrohydraulic convertor during an electrical failure affecting the electrohydraulic convertor and thereby allows the servo system to seek to a neutral position.

3. A control device according to claim 2 wherein the electrohydraulic convertor comprises two electrically actuated proportional pressure reducing valves (17) wherein the output pressure is proportional to the input current and each of the pressure reducing valves has an output pressure and receives a hydraulic pilot pressure signal based upon the respective output pressure.

4. A control device according to claim 2 wherein electrohydraulic convertor (25) for controlling the servo system (4) comprises a proportional pressure reducing valve operated in two directions, the electrohydraulic convertor has a spool with two opposite ends, each of the spool ends receives a pilot pressure signal based upon the output pressure of the electrohydraulic convertor so as to urge the spool to an output pressure draining position from either direction.

5. A method for the infinite control of the volume flow of a hydraulic machine whereby a servo system (4) is connected to a swash plate of the hydraulic machine; comprising:

pressure controlling of the servo system (4) by means of an electrohydraulic convertor (25;17), conducting a feedback signal indicative of a swash angle position of the swash plate of the corresponding hydraulic machine from a sensor to an electronic control unit (12), controlling a swash angle position of the swash plate of the corresponding hydraulic machine by means of an electrical input current generated by the electronic control unit (12) and received by the electrohydraulic convertor (25;17) such that the electrohydraulic convertor (25; 17) has an output pressure proportional to the input current, conducting a hydraulic pilot pressure signal from the output pressure of the electrohydraulic convertor to an end of a spool in the electrohydraulic convertor so as to urge the spool into a position which allows the output pressure to drain from the servo system back through the electrohydraulic convertor during an electrical failure affecting the electrohydraulic convertor, whereby the servo system seeks a neutral position during an electrical failure.

* * * * *